United States Patent
Duquesne et al.

(10) Patent No.: US 7,322,882 B2
(45) Date of Patent: Jan. 29, 2008

(54) GRAIN CLEANING SYSTEM FOR A COMBINE HARVESTER

(75) Inventors: Frank R. G. Duquesne, Zwevegem (BE); Tom N. N. Somers, Aalter (BE)

(73) Assignee: CNH America LLC, New Holland, PA (US)

( * ) Notice: Subject to any disclaimer, the term of this patent is extended or adjusted under 35 U.S.C. 154(b) by 194 days.

(21) Appl. No.: 11/146,797

(22) Filed: Jun. 7, 2005

(65) Prior Publication Data

US 2005/0282601 A1 Dec. 22, 2005

(30) Foreign Application Priority Data

Jun. 22, 2004 (GB) ................... 0413957.2

(51) Int. Cl.
*A01F 12/32* (2006.01)
*B07B 1/00* (2006.01)

(52) U.S. Cl. .................... 460/101; 460/92; 460/93; 209/233

(58) Field of Classification Search ............... 460/101, 460/102, 9, 97, 91, 92, 93; 209/416, 261, 209/233

See application file for complete search history.

(56) References Cited

U.S. PATENT DOCUMENTS

| | | | | |
|---|---|---|---|---|
| 2,500,448 | A * | 3/1950 | Bozarth | 209/416 |
| 2,718,967 | A * | 9/1955 | Potter | 209/261 |
| 4,355,647 | A * | 10/1982 | Heidjann et al. | 460/91 |
| 4,535,788 | A * | 8/1985 | Rowland-Hill et al. | 460/9 |
| 4,548,214 | A * | 10/1985 | Sheehan et al. | 460/9 |
| 4,557,276 | A * | 12/1985 | Hyman et al. | 460/9 |
| 4,598,718 | A * | 7/1986 | Glaubitz et al. | 460/9 |
| 4,736,753 | A * | 4/1988 | Glaubitz et al. | 460/9 |
| 5,205,786 | A * | 4/1993 | Murphy | 460/9 |
| 6,468,154 | B1 * | 10/2002 | Eggenhaus et al. | 460/101 |
| 6,582,298 | B2 * | 6/2003 | Wolters | 460/97 |
| 6,672,957 | B2 * | 1/2004 | Voss et al. | 460/101 |
| 6,843,719 | B1 * | 1/2005 | Sacquitne | 460/101 |

FOREIGN PATENT DOCUMENTS

| | | |
|---|---|---|
| DE | 199 08 696 C1 | 10/2000 |
| GB | 2 072 050 A | 3/1980 |
| GB | 2 146 218 A | 4/1985 |

* cited by examiner

*Primary Examiner*—Árpád Fábián Kovács
(74) *Attorney, Agent, or Firm*—Michael G. Harms; John William Stader; Patrick M. Sheldrake

(57) ABSTRACT

A drive linkage is described for reciprocating a sieve that is suspended within a frame of a combine harvester for movement in mutually orthogonal directions. The drive linkage comprises a cranking mechanism for imparting a reciprocating motion to the sieve in the direction of travel of the harvester and a pivot arm pivotably connected at one end to one side of the sieve to cause the sieve to move in an arc centered on a pivot axis at the opposite end of the pivot arm as the sieve is reciprocated. In the invention, the pivot axis of the pivot arm is displaced relative to the frame in synchronism with the reciprocation of the sieve in such a manner as to cause the sieve to follow a substantially rectilinear path relative to the frame.

8 Claims, 6 Drawing Sheets

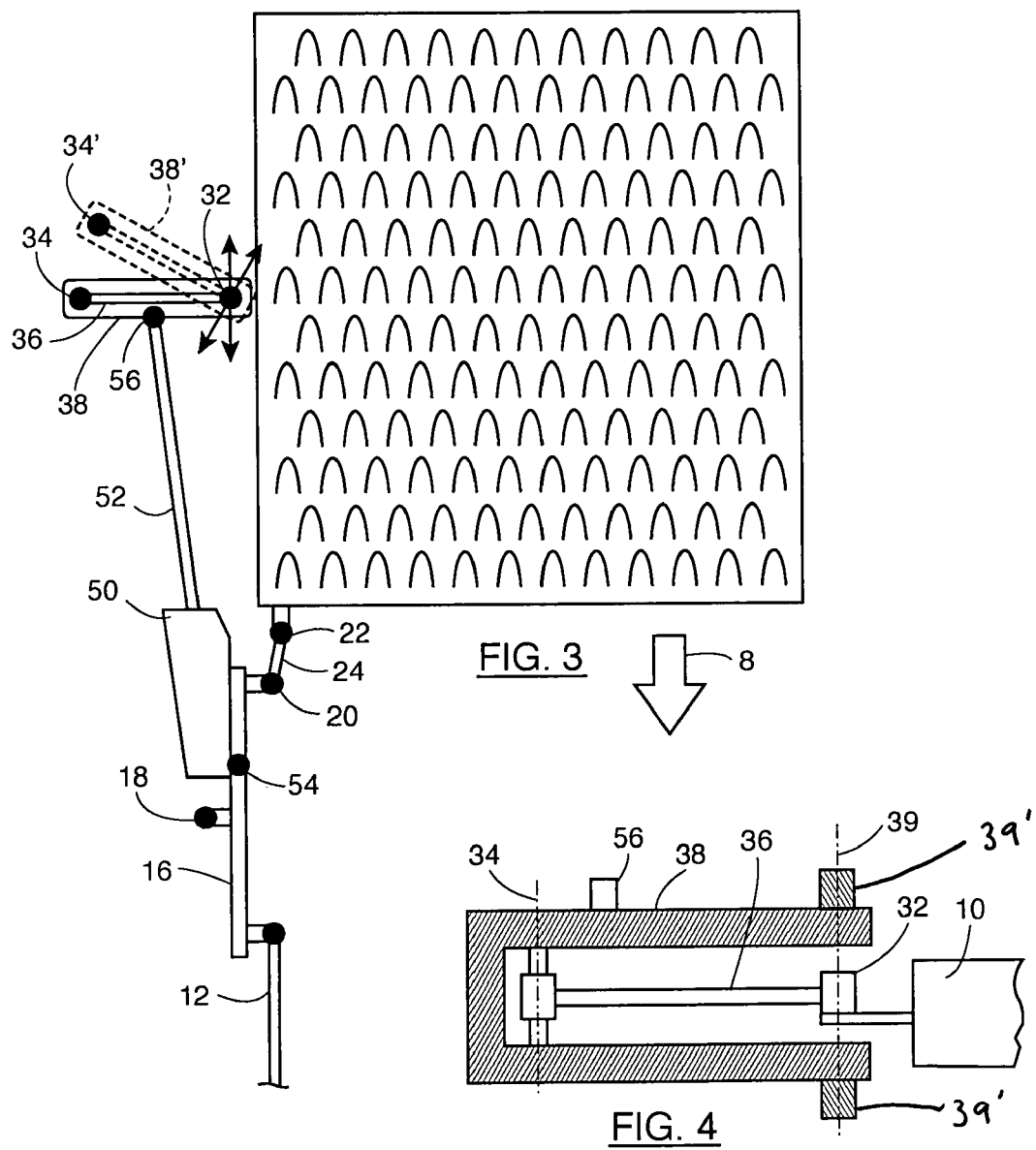
FIG. 3
FIG. 4
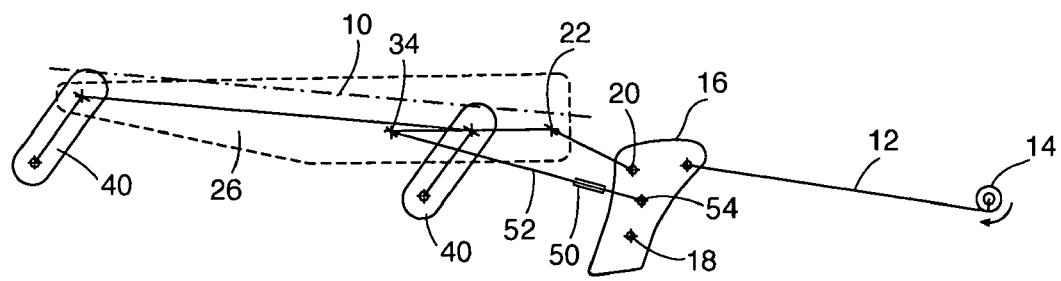
FIG. 5

GRAIN CLEANING SYSTEM FOR A COMBINE HARVESTER

CROSS REFERENCE TO RELATED PATENT APPLICATIONS

This Patent Application claims priority under 35 U.S.C. § 119 to GB 0413957.2, filed on Jun. 22, 2004 titled, "Grain Cleaning System for a Combine Harvester", the full disclosure of which is hereby fully incorporated herein by reference.

FIELD OF THE INVENTION

The present invention relates to a combine harvester and is particularly concerned with a drive linkage employed to reciprocate the sieves of a combine harvester to separate the grain from the remainder of the crop material.

BACKGROUND OF THE INVENTION

In a combine harvester, after a crop has been cut, it is passed through a thresher, which acts to separate the grain from the stalks or the straw. The straw is transported to the back of the harvester while the grain and other crop particles drop onto a sieve. The material other than grain (MOG) comprises chaff, short straw and other particles that the thresher has separated from the longer straw stems.

The sieve is reciprocated while air is blown upwards through it. The shaking of the sieve distributes the grain evenly over the area of the sieve and conveys the grain and MOG towards the back of the harvester. The grain that drops through the sieve is collected in a sieve box, from which it is transported to a grain tank. Commonly, a second sieve is reciprocated below the first sieve for further cleaning of the grain sample.

A problem is experienced with combine harvesters when operating on the side of a hill because the grain and MOG tend to accumulate on the downhill side of the sieve. As a result, the layer of crop material on the sieve shows some holes or lightly loaded areas, through which a substantial amount of air can escape. The consequent pressure drop also affects the crop-loaded areas, such that less MOG is lifted up and blown out of the combine harvester. Moreover, the available area of the sieve is not used effectively; grain mingled with MOG remains concentrated near the lower side of the sieve and grain loss occurs because many kernels are conveyed out of the combine harvester, together with the MOG.

This problem is addressed in GB-A-2072050, which proposes altering the angle of oscillation of the entire sieve box. Instead of the sieves being reciprocated parallel to the direction of travel of the combine harvester, they are oscillated at an angle to the direction of travel of the combine harvester. Consequently, the grain tends to be conveyed uphill by the oscillation of the sieves, thereby counteracting the effect of gravity and distributing the grain and MOG more evenly over the surface of the sieves.

In GB 2072050, the grain collecting box, also called cleaning shoe, which holds the sieves, is fitted with guide rollers that are slidably received in cam tracks, which can be pivoted on the frame of the combine harvester to alter the direction of reciprocation of the sieves. Such an arrangement for guiding the movement of the sieves is not however satisfactory because of excessive wear on the cam tracks and because of the limited life of the rolling element bearings used in the guide rollers.

GB 2146218, which is believed to represent the closest prior art to the present invention, provides a drive linkage for reciprocating a sieve that is suspended within a frame of a combine harvester for movement in mutually orthogonal directions. The drive linkage comprises a cranking mechanism for imparting a reciprocating motion to the sieve in the direction of travel of the harvester. The drive linkage further provides a pivot arm pivotably connected at one end to one side of the sieve to cause the sieve to move in an arc centered on a pivot point at the opposite end of the pivot arm as the sieve is reciprocated.

GB-A-2146218 improves on the proposal in GB 2072050 in two ways. First, instead of the grain collecting box being reciprocated, only the upper sieve is reciprocated, thereby reducing the oscillating mass. Second, the guide rollers and cam tracks are replaced by a pivot arm, which constrains the sieve to follow an arc. By altering the position of the axis about which the pivot arm rotates, it is possible to adapt the movement of the sieve to suit different ground inclinations. In this case, the connections at the opposite ends of the pivot arm can be formed as rubber bushes that can operate reliably over prolonged periods.

A disadvantage of the geometry of the drive linkage taught in GB 2146218 is that the sieve no longer moves in a straight line but in an arc. When the sieve is constrained by a pivot arm to oscillate along an arcuate path, its operation is asymmetrical and it is not capable of compensating equally for slopes in opposite directions. This deviation becomes particularly evident when compensating for steeper slopes. Furthermore, the compensation system is controlled by a pendulum system, which allows no adjustment of the trajectory to changing crop conditions, such as crop type, humidity, grain to MOG ratio, etc.

SUMMARY OF THE INVENTION

The invention thus seeks to provide a drive linkage which uses pivot arms rather than cams to reciprocate a sieve but enables the sieve to move along a substantially linear path that can be inclined at a selectable angle to the direction of travel.

According to the present invention, there is provided a drive linkage for reciprocating a sieve that is suspended within a frame of a combine harvester for movement in mutually orthogonal directions, comprising a cranking mechanism for imparting a reciprocating motion to the sieve in the direction of travel of the harvester and a pivot arm pivotably connected at one end to one side of the sieve to cause the sieve to move in an arc centered on a pivot axis at the opposite end of the pivot arm as the sieve is reciprocated, wherein means are provided for displacing the pivot axis of the pivot arm relative to the frame in synchronism with the reciprocation of the sieve in such a manner as to cause the sieve to follow a substantially rectilinear path relative to the frame.

The displacing means, e.g., a drive linkage, of the present invention, straighten the path of the sieve by moving the pivot axis of the pivot arm to superimpose an oscillation on the arm, parallel to its own length, of sufficient magnitude to counteract the curvature of the path followed by the sieve.

It will be appreciated that, although the invention has been described with reference to a drive linkage means for displacing the pivot axis of the pivot arm, still other embodiments can be thought of without departing from the original idea of the invention as defined by the claims. For instance, it is possible to provide an oscillation system that comprises a distinct hydraulic or electrical motor that is drivingly connected to the axis of the pivot arm, and an electrical and/or hydraulic control system for driving the motor in synchronism with the sieve fore-and-aft movement at the appropriate amplitude around the appropriate mean angle, in accordance with the teaching of FIGS. 6 and 7. The choice of the mean angle defines the direction needed for compensating the effects of working on slopes.

The cranking mechanism for imparting a reciprocating motion to the sieve in the direction of travel of the harvester may suitably comprise a rocker plate that is pivotably mounted on the frame of the combine harvester, a cranking arm or eccentric mechanism for rocking the plate, and a connecting rod connecting the rocker plate to the sieve to impart a reciprocating motion to the sieve as the plate is rocked by the cranking arm or eccentric mechanism.

While it would be possible to provide a second actuator to move the axis of the pivot arm, such a solution would be unnecessarily complicated and expensive. The control system of such a second actuator would have to comprise extra sensors and synchronizing means in order to maintain the synchronization between the longitudinal direction imparted by the cranking mechanism and the movement of the actuator. Moreover, such an actuator must be very robust as it has to be very reliable and work at a high frequency (about 5 Hz).

In a preferred embodiment of the invention, the axis of the pivot arm is carried on a support lever, which is pivotable relative to the frame by means connecting the support lever and the rocker plate. Advantageously, these connecting means may comprise a variable length actuator connecting the support lever to the cranking mechanism.

The length of the actuator will determine the mean position of the pivot axis of the pivot arm and will therefore set the inclination of the path followed by the sieve. Furthermore, as the actuator is itself mounted on the rocker plate, it will automatically superimpose an oscillation on the support lever which is in phase with the movement of the sieve. By suitable selection of the geometry of the support lever, the rocker plate, the pivot arm and the actuator, it is thus possible to ensure that the path followed by the sieve is substantially straight.

This arrangement ensures that the support lever, which positions the axis of the pivot arm, is driven in synchronism with the sieve. However, as will be detailed below in the "Description of the Preferred Embodiments" section, it is also contemplated that other, alternative means can be used.

When a side slope compensation system as described above is installed in a combine harvester and it is operating on a slope, the material on the sieve is accelerated to the uphill side of the combine by the compensation system to compensate for the effect of gravity. However, when dealing with various kinds of seeds, one is also dealing with a variety of seed density. The result of this is that denser seeds, such as soya beans, tend to drop under the effect of gravity much faster than less dense seeds, such as grass seed. As a consequence, despite the side slope compensation, the sieves will still not always be equally loaded.

It would be advantageous in setting the degree of lateral movement of the sieve, to allow not only for the slope but also for the density of the grain.

In an advantageous development of the invention, the combine is fitted with a variable speed fan so that the fan speed may be varied to suit the prevailing operating conditions. It has been found that optimal fan speed is closely related to the density of the crop material on the sieve surface.

The control of the fan speed may be effected by the operator or automatically. A fan speed signal is generated by a fan speed sensor and monitored by the combine control system. The actual fan speed is displayed to the operator in the cab.

The use of the fan speed as an additional operating parameter can allow the control algorithm of the slope compensation system to be fine-tuned in that the lateral movement of the sieve may be varied to take into account the slope of the ground and the fan speed to compensate for variation in both the ground slope and the grain density.

Because the fan speed is continuously being monitored and the operator can easily alter the speed, this is a simple adjustment with which the operator is already familiar, so that is does not present an added inconvenience.

BRIEF DESCRIPTION OF THE FIGURES

The invention will now be described further, by way of example, with reference to the accompanying drawings, in which:

FIG. 3 is a plan view similar to that of FIG. 1, showing an embodiment of the present invention;

FIG. 4 is a schematic side elevation of the pivot arm used in FIG. 3 together with its support lever;

FIG. 5 is a diagram similar to that of FIG. 3 showing the principle of operation of the embodiment of the invention shown in FIG. 4;

DETAILED DESCRIPTION OF THE PREFERRED EMBODIMENTS

Figure 1:
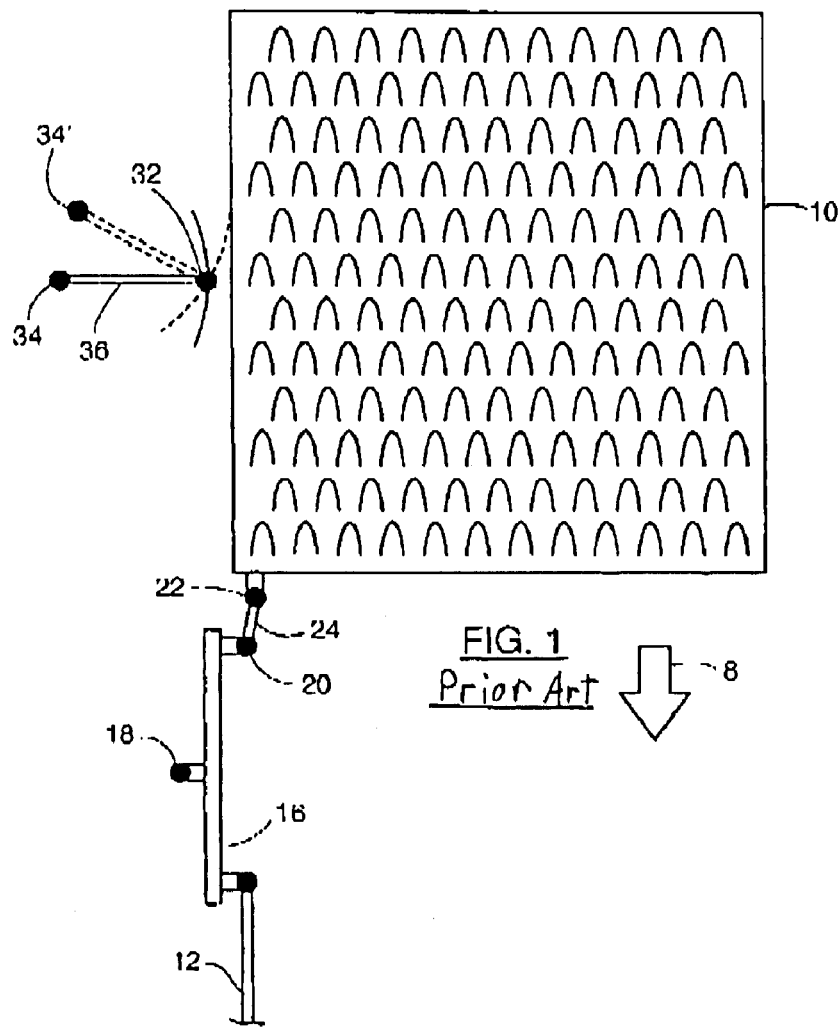
FIG. 1 is a schematic plan view of a sieve fitted with a slope compensation system as described in the prior art.
Figure 2:
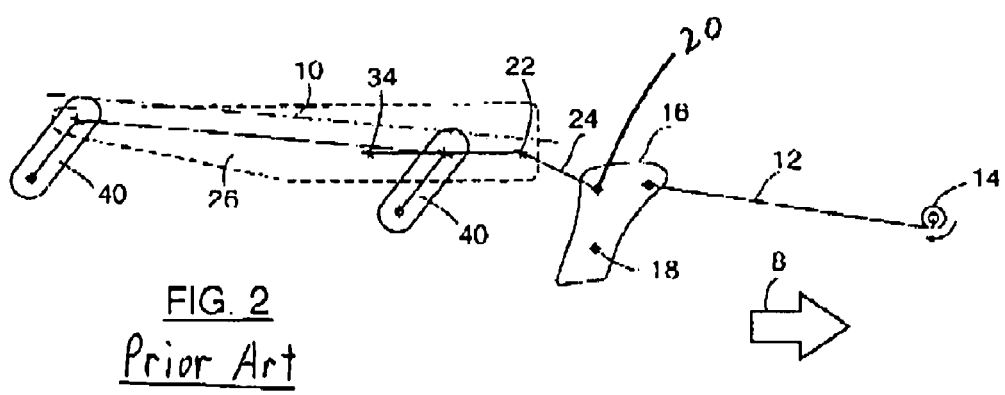
FIG. 2 is a diagram to show the principle of operation of the slope compensation system of FIG. 1.

The apparatus of FIGS. 1 and 2 operates on the same principle as the apparatus described in GB 2146218. For this reason, the apparatus has only been shown schematically to permit an understanding of the invention but reference may be made to GB 2146218 for a more detailed description of its construction.

A sieve 10 is mounted in the combine harvester in such a matter that it can be moved freely both fore and aft and from side to side. As illustrated in FIG. 2, the sieve 10 in the illustrated apparatus is supported from below by posts 40 having rubber bushes at both ends to permit them to pivot in mutually orthogonal planes. It is however alternatively possible to suspend the sieve 10 from above, as illustrated in FIG. 1 of GB 2146218.

To move the sieve 10 in the fore and aft direction, that is to say parallel to the direction of movement 8 of the combine harvester, a cranking mechanism comprising a crank 14 or eccentric mechanism is connected to a connecting rod 12, of which the opposite end is connected to a rocker plate 16. The rocker plate 16, which lies in a vertical plane, is itself mounted on the frame of the combine harvester by means of a pivot 18, which permits it to rock clockwise and anticlockwise as the crank 14 rotates. A second connecting rod 24, with pivots 20 and 22 at its opposite ends, connects the rocker plate 16 to the sieve 10. All the pivots are preferably formed as rubber bushes, which permit the sieve 10 to move from side to side at the same time as it is being reciprocated fore and aft by the crank 14. The pivot 22 and the posts 40 do not need to be connected directly to the sieve 10; they may also be connected to a cleaning shoe 26 wherein the sieve is mounted.

To compensate for the slope of the ground, the sieve 10 is connected by a pivot 32 to one end of a pivot arm 36. The opposite end of the pivot arm 36 can pivot about a rubber bush constituting a vertical pivot axis 34. The axis 34 is provided adjacent the outer end of a stationary support lever 38, which is pivotably connected at its inner end to the frame of the combine harvester. The effect of anchoring one side of the sieve 10 to the frame of the combine harvester in this way is that, as it is reciprocated by the crank 14, it is constrained to move in an arc, thereby superimposing a side to side oscillation on the sieve 10 as it is reciprocated fore and aft.

As shown by the arcs drawn in FIG. 1 in solid and dotted lines, moving the support lever to position 38' (see FIG. 3), and thereby also the pivot axis to position 34', alters the path of movement of the sieve 10. Thus the sieve 10 can oscillate along a line of which the inclination to the direction of movement is adjustable by rotating. the support lever 38. In the prior art, the position of the pivot axis 34 is set by an actuator mounted on the frame of the combine harvester, the actuator enabling the direction of movement of the sieve 10 to be adjusted to compensate for the slope of the ground.

As earlier mentioned, the above described known construction is asymmetrical and does not allow an equal degree of compensation for both slope directions. This is because the movement of the sieve 10 follows an arc rather than a straight line. Hence, when the pivot arm 36 is disposed in its central position at right angles to the sieve 10, the lateral acceleration of the sieve 10 is not zero at all times, even though it may average zero over an operating cycle.

The action of the lateral acceleration of the sieve 10 is to throw the grain and MOG up and to one side and this tends to happen at the beginning of each stroke of the cycle. During the later part of each stroke, when the sieve 10 is accelerated in the opposite direction, the grain and MOG tends to be in mid-air and unaffected by the movement of the sieve 10. Hence, despite the averaging out of the lateral acceleration over a cycle of oscillation, the crop material tends to be thrown to the right, as viewed in FIG. 1.

This is to the left of the combine harvester. Left and right hand sides of the harvester are defined with respect to the normal direction of movement 8 of the vehicle. Because of this bias to the left, even in the central position of the pivot axis 34, the apparatus has a greater ability to compensate for a slope in one direction than in the other, and it is the lesser of the two that limits the slope on which the combine harvester can be claimed to operate efficiently.

Good compensation for a slope to the left hence implies a displacement of the support lever 38 over a different distance than for the same slope to the right. This asymmetry is not significant for small slope angles, but becomes substantial for slopes over 10%.

To mitigate the above problem, the invention adopts the approach that the arc can be converted to an at least approximately straight line if the pivot axis 34 is moved cyclically in synchronism with the reciprocating movement of the crank 14. Thus, if in the position of the pivot arm 36 shown in FIG. 1, the pivot axis 34 were to be moved inward when the sieve 10 is at the limits of its fore and aft movement and moved back to its original position when the sieve 10 is at its midpoint in its fore and after movement, then the curvature can be taken out of the arc.

While one can envisage various complex ways of achieving this objective of oscillating the position of the pivot axis 34, the preferred embodiment of the invention, which will now be described by reference to FIGS. 3 to 5, succeeds in doing so with a minimum of modification to the known apparatus. In particular, the preferred embodiment of the invention does not require the use of an independent oscillatory driver and means for maintaining such a second driver in phase with the crank 14.

In the embodiment of the invention, as best shown in FIG. 4, the pivot arm 36 is mounted between the two limbs of a U-shaped support lever 38 which is itself pivotable relative to the frame of the combine harvester about an axis 39 defined by two projecting pins 39'. Thus, looking at the apparatus from above, as shown in FIG. 3, by pivoting the support lever 38 between the positions 38 and 38' shown in solid and dotted lines, the pivot axis of the pivot arm 36 is moved between positions 34 and 34'.

In contrast to the known arrangement in which the pivot axis 34 is moved in response to slope changes by an actuator that is mounted on the frame of the combine harvester, in the preferred embodiment of the invention, the pivot axis 34 is moved by means of an actuator 50, preferably a variable length actuator, such as a linear electrical or hydraulic actuator, which is pivotally mounted on the rocker plate 16 by a pivot 54 and connected to the support lever 38 by a pivot 56. The pivot 54 does not coincide with the pivot 18 of the rocker plate 16.

However, it is also contemplated that other, alternative means can exist. For example, possible alternatives comprise an extendable pantograph structure that uses the same pivots 54, 56 as in the detailed embodiment; a linkage constituted by two arms between pivots 54 and 56, the arms being movable to each other by a rotary actuator, as in a pair of compasses (the actuator is rotated to increase or diminish the angle between the two arms); and a fixed length connection between pivots 54 and 56, pivot 54 being movable relative to the rocker plate. Regarding the fixed length connection embodiment, it is contemplated that the pivot 54 may be guided along a trajectory that is centered on the rocker plate pivot 18, in a direction that is substantially perpendicular to the line connecting the pivot 18 and the mean position of the pivot 54. Movement of the pivot along the trajectory does not modify the amplitude of the oscillating pivot, but changes the mean position of the lever 38 and the pivot 34. The movement along the trajectory is controlled by an actuator in dependence of the slope. Alternatively, the pivot 54 may have a fixed position and the pivot 26 may be displaceable along a trajectory on the support lever 38. This trajectory then extends in a fore-and-aft direction.

The rod 52 of the actuator 50 can be extended and retracted to set the desired inclination of the direction of oscillation of the sieve 10 to the direction of movement 8 of the combine harvester. In all positions of the actuator, however, the support lever 38 is oscillated by its connection to the rocker plate 16 to move the pivot axis 34 in the correct direction to counteract the curvature that would otherwise be present in the movement of the sieve 10.

Figure 6:
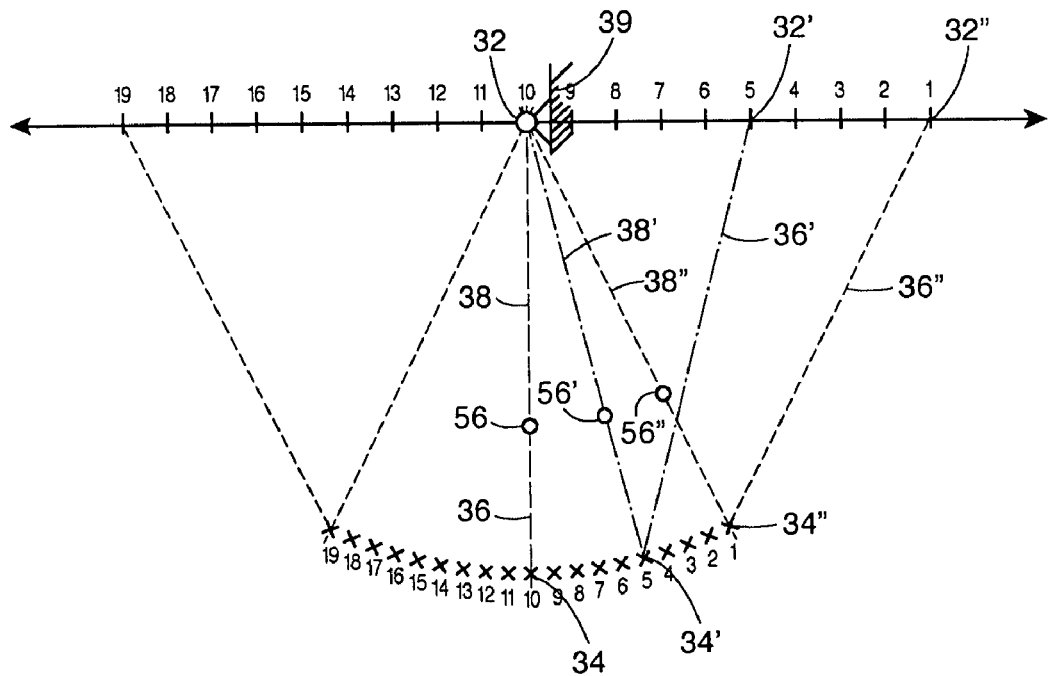
FIG. 6 is a scheme illustrating the movements of the support lever and the pivot arm of FIGS. 3 and 4, imposing upon the sieve a rectilinear movement parallel to the side of the sieve.

The required oscillatory movement of the support lever 38 for moving the sieve 10 along a rectilinear path can be derived from a diagram such as shown in FIG. 6. Herein, the upper straight line represents the positions taken by the sieve connection pivot 32 during phases (1-19) of the forward movement. This line is parallel to the direction of movement of the vehicle, such that there is no compensation for slopes.

In their mean position (10), the directions of the pivot arm 36 and the support lever 38 will coincide and extend perpendicular to the sieve movement. The pivot axis 34 of the pivot arm 36 travels along a circular path, defined by the stationary pivot axis 39 and the support lever 38. For each of the positions (1-19) of the sieve connection pivot 32, it is possible to determine the corresponding positions (1-19) of the pivot axes 34, and hence of the support lever 38.

For a rectilinear movement of the sieve 10 between positions (1) and (19), it is necessary to impose a movement between corresponding positions (1) and (19) on the support lever 38. This displacement defines the necessary amplitude of the lever oscillation. This amplitude can be implemented by choosing the appropriate distance between the pivot 18 of the rocker plate 16 and the pivot 54 of the actuator 50.

As oscillations imposed on the movement of the support lever 38 are derived from the crank 14, they are always in the correct phase relative to the reciprocation of the sieve 10, avoiding the need for a separate control system.

Figure 7:
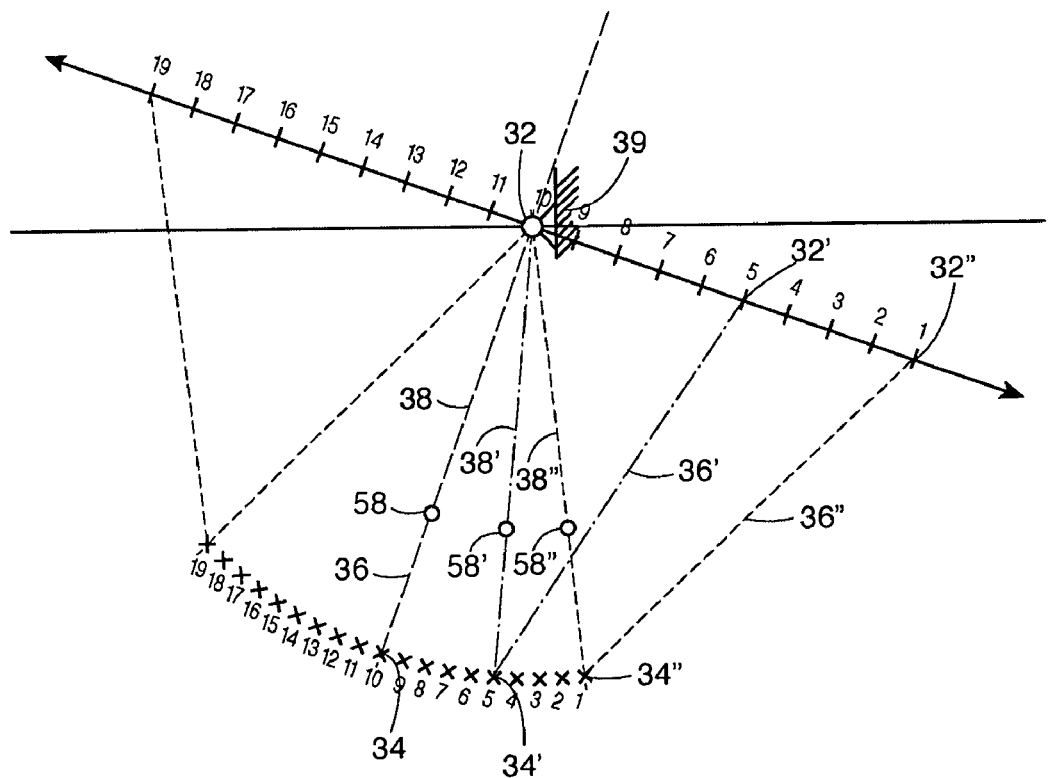
FIG. 7 is a scheme similar to FIG. 6, illustrating the movements of the support lever and the pivot arm, imposing upon the sieve a rectilinear movement in an inclined direction in order to counter downhill movement of the crop material.

When it is necessary to reciprocate the sieve along an inclined line, as shown in FIG. 7, there are no substantial changes to the relative positions of the pivot arm 36 and the support lever 38. It suffices to rotate the mean position (10) of the support lever 38 until it extends at an angle perpendicular to the new inclined sieve direction. The mean position of the pivot arm 36 changes concurrently. The mean position of the support lever 38 is changed by extending or retracting the actuator 50. Thereafter the rectilinear movement is realized by the linkage constituted by the rocker plate 16, the connecting rod 24, the now stationary actuator 50, the support lever 38 and the pivot arm 36.

One can envisage other geometries that would connect the pivot axis 34 to a crank driven in synchronism as the crank 14. However, mounting the actuator 50 on the rocker plate 16 simplifies packaging and provides a simple and elegant solution that can be implemented inexpensively.

It is an important advantage of the invention that the rectilinear movement of the sieve 10 is achieved without the use of any components such as cam tracks and ball or roller bearings that would wear rapidly in the hostile operating environment.

Figure 8:
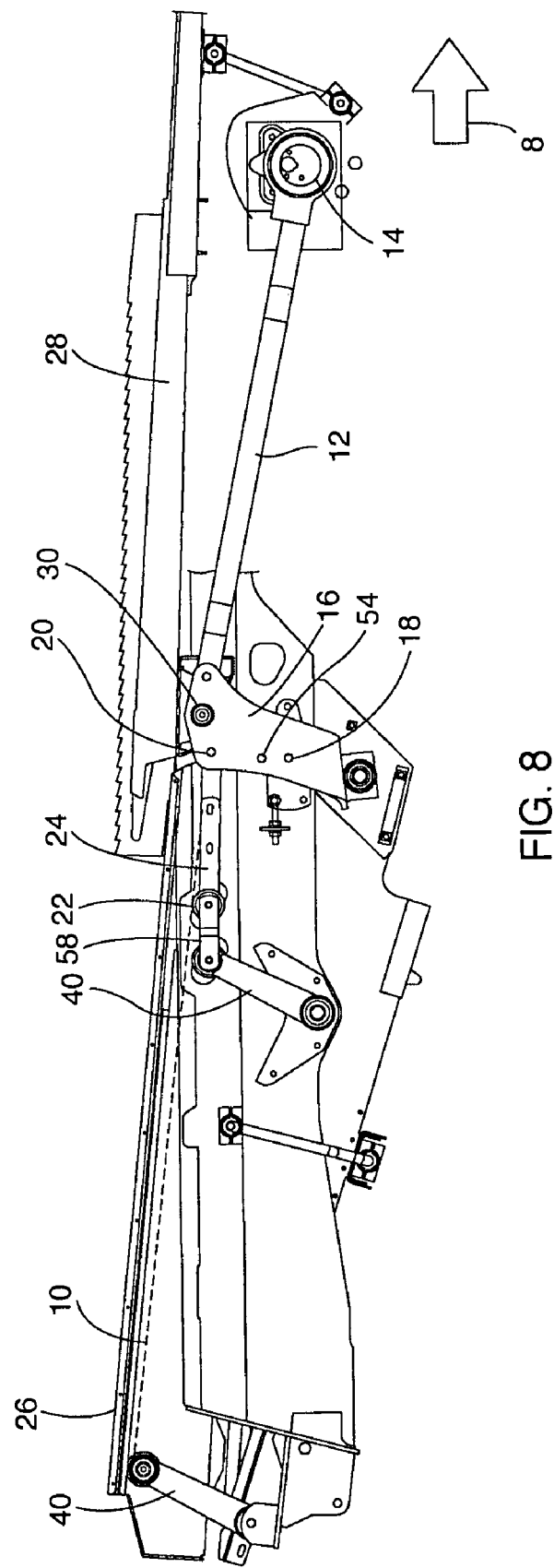
FIG. 8 is a detailed side view of a cleaning system to which the compensation system of FIG. 3 can be applied.
Figure 9:
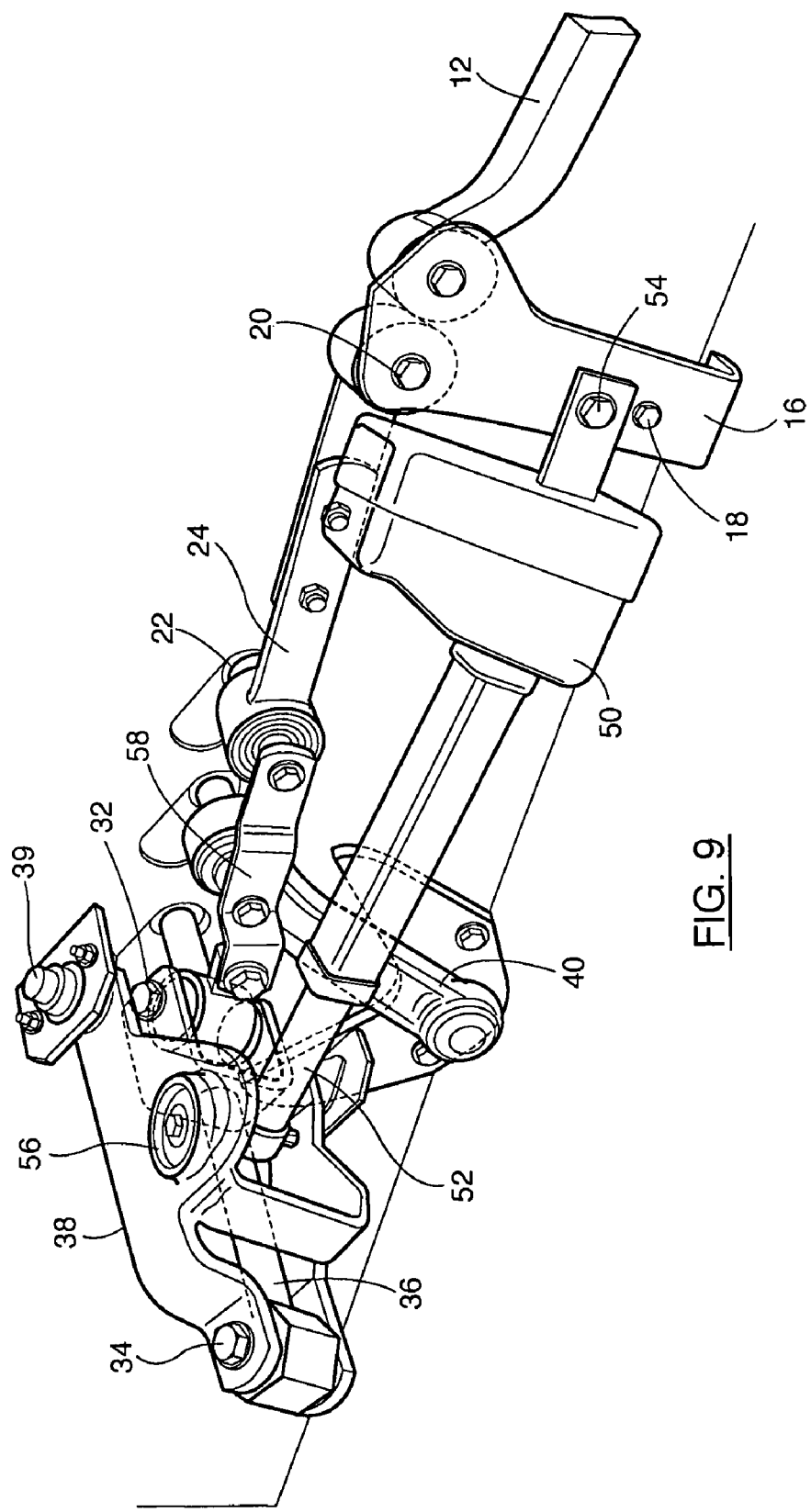
FIG. 9 is a detailed side view of a compensation system according to the invention, applied to the cleaning system of FIG. 8.
Figure 10:
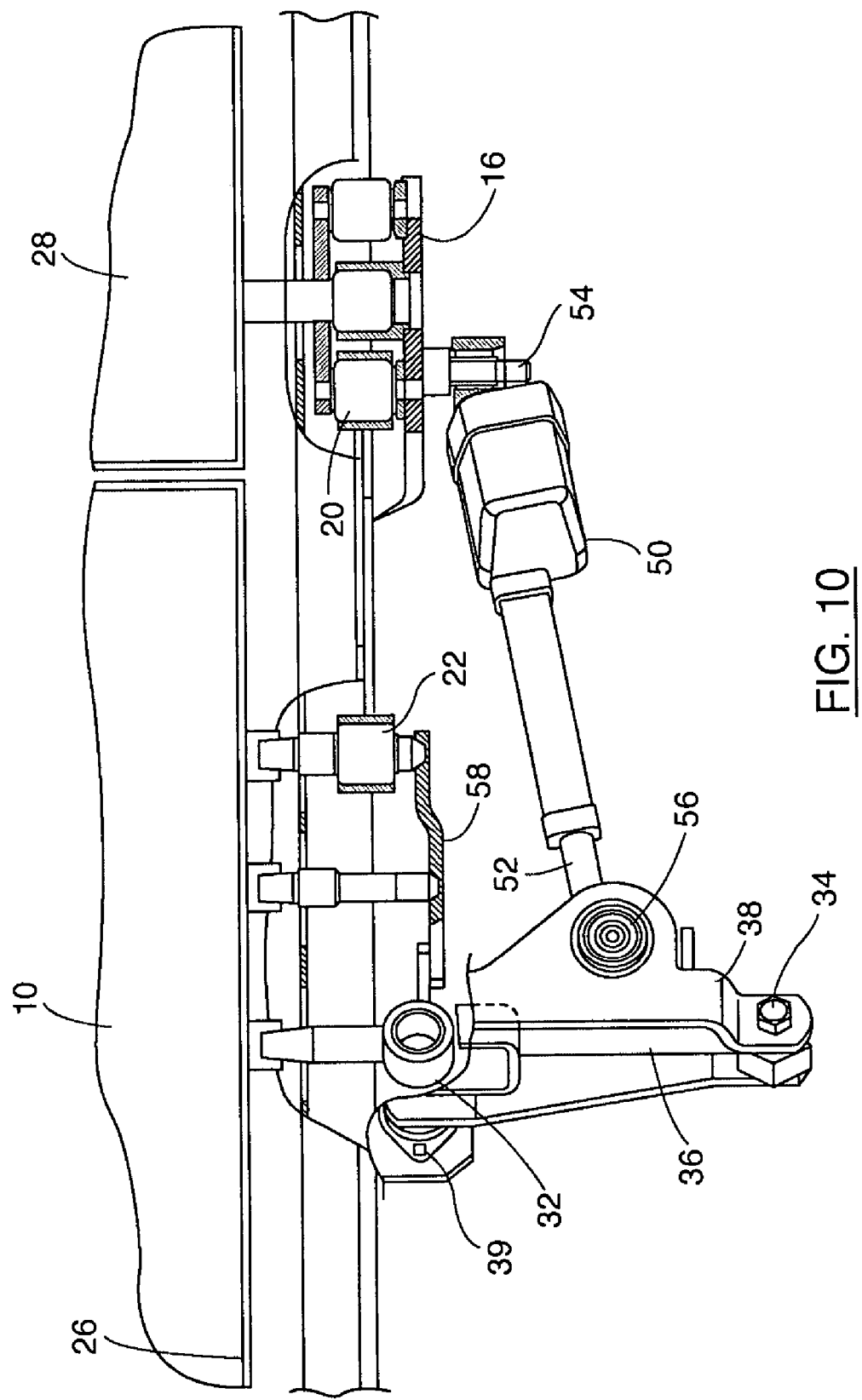
FIG. 10 is a sectional top view of the compensation system of FIG. 9.

A more detailed embodiment of the invention is described hereinafter with reference to FIGS. 8 to 10. FIG. 8 shows a cleaning system which is typically installed in a combine harvester below the threshing and separating sections. The front end is provided with a grain pan 28 and the rear end with a cleaning shoe 26, to which the sieve 10 is removably mounted.

The cleaning system is reciprocated by an eccentric mechanism 14, which oscillates a rocker plate 16 on each side of the harvester frame about the pivot 18. The grain pan 26 is connected to the rocker plate 16 by a resilient bush 30 near the top of the plate. The cleaning shoe 26 and the sieve 10 are connected via a pivot 22 and a command rod 24 to the same end of the rocker plate 16. A lower sieve (not shown) is connected to the lower end of the rocker plate for oscillating this sieve in anti-phase. The right hand pivot plate 26 is provided with a pivot 54 to which is mounted the slope compensation system of FIGS. 9 and 10.

The support lever 38 is mounted to the harvester frame for pivot about the axis 39, which deviates somewhat from the vertical in order to enable movement in the same inclined plane as the cleaning shoe 26 and the sieve 10. Their trajectory is defined by the inclined posts 40 on both sides of the harvester. The lever 38 is driven by the right hand rocker plate 16 via an extendable actuator 50 and pivot 56, which may be a ball joint. The distance of the pivot 56 from the pivot axis 39 and the distance of pivot 54 from the rocker plate pivot 18 are calculated to provide the necessary oscillation amplitude to the support lever 38 as determined with reference to FIG. 6.

The sideways movement of the sieve 10 is controlled by the pivot arm 36, which is mounted for pivot about axis 34 on the outer end of the lever 38. The inner end of the arm 36 has a pivot 32 that is attached via a conical pin to the cleaning shoe 26. In order to strengthen the bond with the cleaning shoe 26, the latter pivot 32 is equally linked by a connection 58 to the front pivot 22. This ensures that pivots 22 and 32 are driven in unison in general fore and aft direction.

For the operation of this slope compensation mechanism we refer to the description above relating to FIGS. 3 to 5. The reference numbers have been retained for the elements having the same function.

As mentioned earlier, the action of the lateral acceleration of the sieve 10 is to throw the crop material to one side so as to obtain a more even distribution of the grain and MOG over the surface of the sieve 10 as the combine harvester is moving over an inclined surface. However, the extent of the crop redistribution depends not only on the inclination of the direction of reciprocation of the sieve 10 but also on the density of the grain and MOG. Hence, when grass seed is thrown up, it tends to remain suspended in the draught of air passing through the sieve for longer than more dense grain such as soya beans and it can therefore be redistributed using a smaller angle of oscillation than the angle required for denser grain.

It has been found that the different paths followed by denser and less dense crop material are not only related to the different effects of the air flow through the sieve. Large grain kernels tend to migrate sideways on slopes more quickly, because the profile of the sieve surface does not retain them as effectively as smaller grain kernels. On the other hand, the rearward and sideward acceleration of the sieves is transmitted more efficiently onto coarse crop material than onto light and fluffy layers grain and MOG. Hence, the characteristics of the crop material, and in particular its density, gravely influence its susceptibility to the sideward movement which is imposed by the transverse oscillation of the sieve.

Therefore, the optimal amplitude of this movement that would restore the longitudinal path of the crop over the sieve, is not only dependent on the slope angle, but also on its density. There is no single, straightforward relationship between the optimal direction for the oscillation of the sieve and the actual slope angle. A control system that would take into account only the slope values, may operate satisfactorily for some particular crop and harvest conditions, but may not be able to minimize grain losses when other crops are being harvested.

To overcome these problems, a combine harvester of a preferred embodiment of the invention also uses data that are indicative of the density of the crop material to determine the required angle of oscillation of the sieve.

It is known to use a variable speed fan to compensate for the density of the grain. By varying the fan speed, it is possible to maintain the MOG suspended in the draught of air for substantially the same length of time. In practice, the operator starts harvesting at a low fan speed and accelerates the fan until a grain loss sensor at the end of the sieve indicates that the losses have reached a predetermined threshold.

This grain loss signal indicates that the fan starts blowing the kernels out of the combine harvester. It is evident that this optimal fan speed is directly related to the density of the grain. Lighter material will require a smaller air flow, and hence a lower fan speed. Denser grain is not expelled as easily, such that higher fan speeds are allowed.

Hence, the fan speed can be used as an input variable in control systems that need to take account of density variations. In particular, the speed value can be used in a control algorithm that determines the amplitude of sideways oscillation of the sieve 10. Nowadays, all combine harvesters are equipped with a fan speed sensor, which generates a signal, which is used for displaying the actual fan speed to the operator. The same signal is directly available for use in the sieve control system.

The enhanced control of the sieve movement can therefore be achieved without increased cost and without placing an undue burden on the operator who will normally be monitoring the efficiency of the cleaning system.

It will be appreciated that, although the invention has been described with reference to a drive linkage means for displacing the pivot axis 34 of the pivot arm 36, still other embodiments can be thought of without departing from the original idea of the invention as defined by the claims. For instance, it is possible to provide an oscillation system that comprises a distinct hydraulic or electrical motor that is drivingly connected to the axis of the pivot arm, and an electrical and/or hydraulic control system for driving the motor in synchronism with the sieve fore-and-aft movement at the appropriate amplitude around the appropriate mean angle, in accordance with the teaching of FIGS. 6 and 7. The choice of the mean angle defines the direction needed for compensating the effects of working on slopes.

What is claimed is:

1. A drive linkage for reciprocating a sieve that is suspended within a frame of a combine harvester for movement in mutually orthogonal directions, the drive linkage comprising:
   a cranking mechanism, the cranking mechanism imparting a reciprocating motion to the sieve in a fore and aft movement in the direction of travel of the harvester; and
   a pivot arm pivotably connected at one end to one side of the sieve, the pivot arm configured to impart movement to the sieve such that the sieve moves in an arc centered on a pivot axis at the opposite end of the pivot arm as the sieve is reciprocated, wherein means are provided for displacing the pivot axis of the pivot arm relative to the frame in synchronism with the reciprocation of the sieve, further wherein the means displaces the pivot axis inwardly when the sieve is at the limits of the fore and aft movement and moved back to a central position when the sieve is at a midpoint in the fore and aft movement, in such a manner as to cause the sieve to follow a substantially rectilinear path relative to the frame.

2. A drive linkage according to claim 1, wherein the pivot axis of the pivot arm is carried on a support lever that is pivotable relative to the frame by means connecting the support lever to the cranking mechanism.

3. A drive linkage according to claim 2, wherein the means connecting the support lever to the cranking mechanism comprise a variable length actuator.

4. A drive linkage according to claim 1, wherein the cranking mechanism comprises:
   a rocker plate, the rocker plate being pivotably mounted on the frame of the combine harvester;
   a cranking arm, the cranking arm configured to rock the plate; and
   a connecting rod connecting the rocker plate to the sieve, such that a reciprocating motion is imparted to the sieve as the plate is rocked by the cranking arm.

5. A drive linkage according to claim 4, wherein the cranking arm is an eccentric mechanism.

6. A drive linkage for reciprocating a sieve that is suspended within a frame of a combine harvester for movement in mutually orthogonal directions, the drive linkage comprising:
   a cranking mechanism, the cranking mechanism imparting a reciprocating motion to the sieve in a fore and aft movement in the direction of travel of the harvester, the cranking mechanism comprising:
   a rocker plate, the rocker plate being pivotably mounted on the frame of the combine harvester;
   a cranking arm, the cranking arm configured to rock the plate; and
   a connecting rod connecting the rocker plate to the sieve, such that a reciprocating motion is imparted to the sieve as the plate is rocked by the cranking arm; and
   a pivot arm pivotably connected at one end to one side of the sieve, the pivot arm configured to impart movement to the sieve such that the sieve moves in an arc centered on a pivot axis at the opposite end of the pivot arm as the sieve is reciprocated, wherein means are provided for displacing the pivot axis of the pivot arm relative to the frame in synchronism with the reciprocation of the sieve, further wherein the means displaces the pivot axis inwardly when the sieve is at the limits of the fore and aft movement and moved back to a central position when the sieve is at a midpoint in the fore and aft movement, in such a manner as to cause the sieve to follow a substantially rectilinear path relative to the frame, and wherein the pivot axis of the pivot arm is carried on a support lever that is pivotable relative to the frame by a variable length actuator, the variable length actuator extending between the support lever and the rocker plate.

7. A combine harvester, the combine harvester including a drive linkage, the drive linkage configured to reciprocate a sieve that is suspended within a frame of a combine harvester for movement in mutually orthogonal directions, the drive linkage comprising:
   a cranking mechanism for imparting a reciprocating motion to the sieve in the direction of travel of the harvester; and
   a pivot arm pivotably connected at one end to one side of the sieve, the pivot arm configured to impart movement to the sieve such that the sieve moves in an arc centered on a pivot axis at the opposite end of the pivot arm as the sieve is reciprocated, wherein means are provided for displacing the pivot axis of the pivot arm relative to the frame in synchronism with the reciprocation of the sieve in such a manner as to cause the sieve to follow a substantially rectilinear path relative to the frame.

8. A combine harvester according to claim 7, further comprising a control system for setting the mean position of the pivot axis of the pivot arm in dependence or ground slope, in order to take account of the density of the grain being harvested.

* * * * *